F. POLSINELLI.
SOWING MACHINE CONSTRUCTION.
APPLICATION FILED AUG. 27, 1918
1,308,679.
Patented July 1, 1919.
5 SHEETS—SHEET 1.
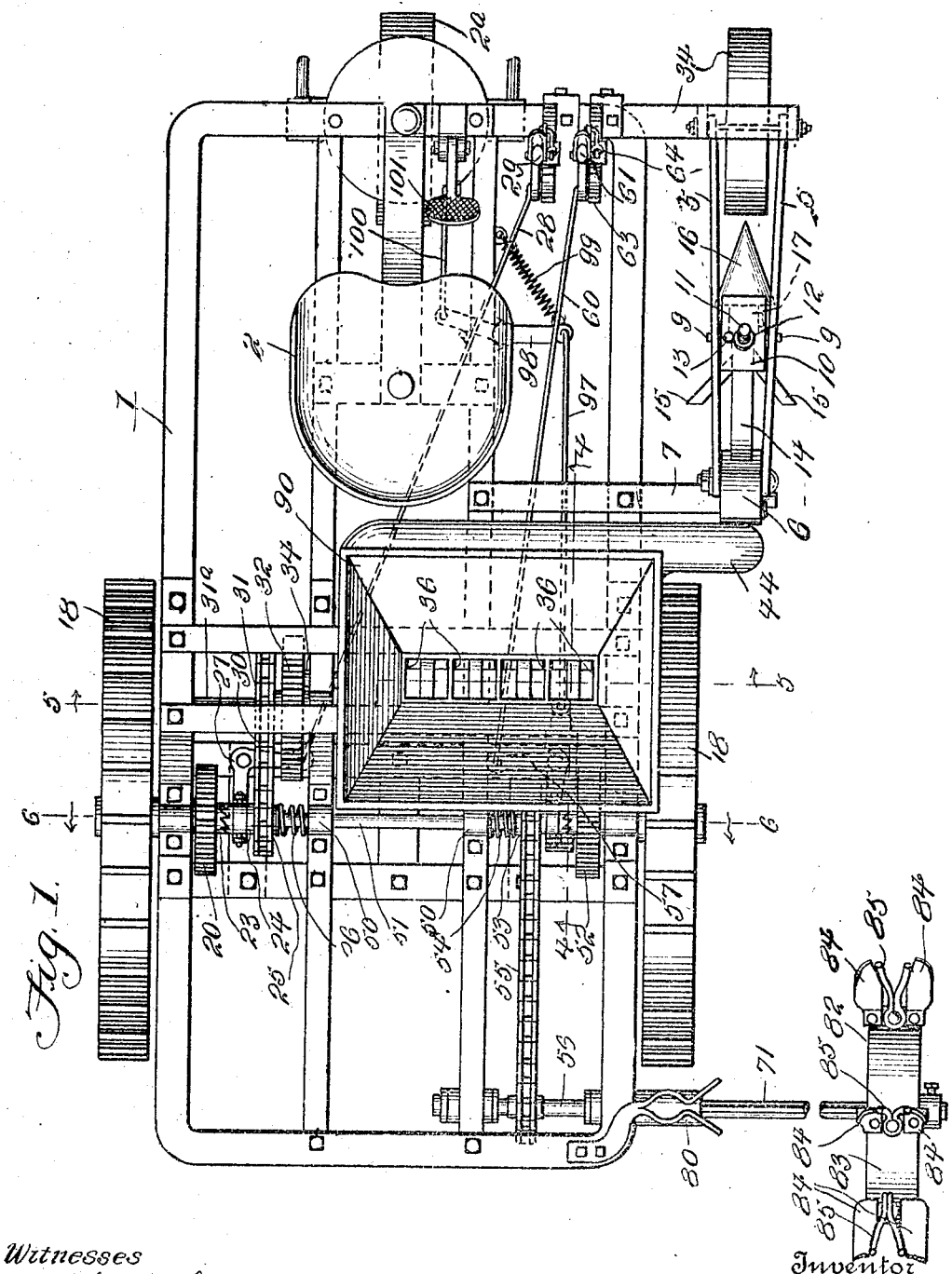
Witnesses
J. L. Wright
Inventor
Frank Polsinelli
By Victor J. Evans
Attorney

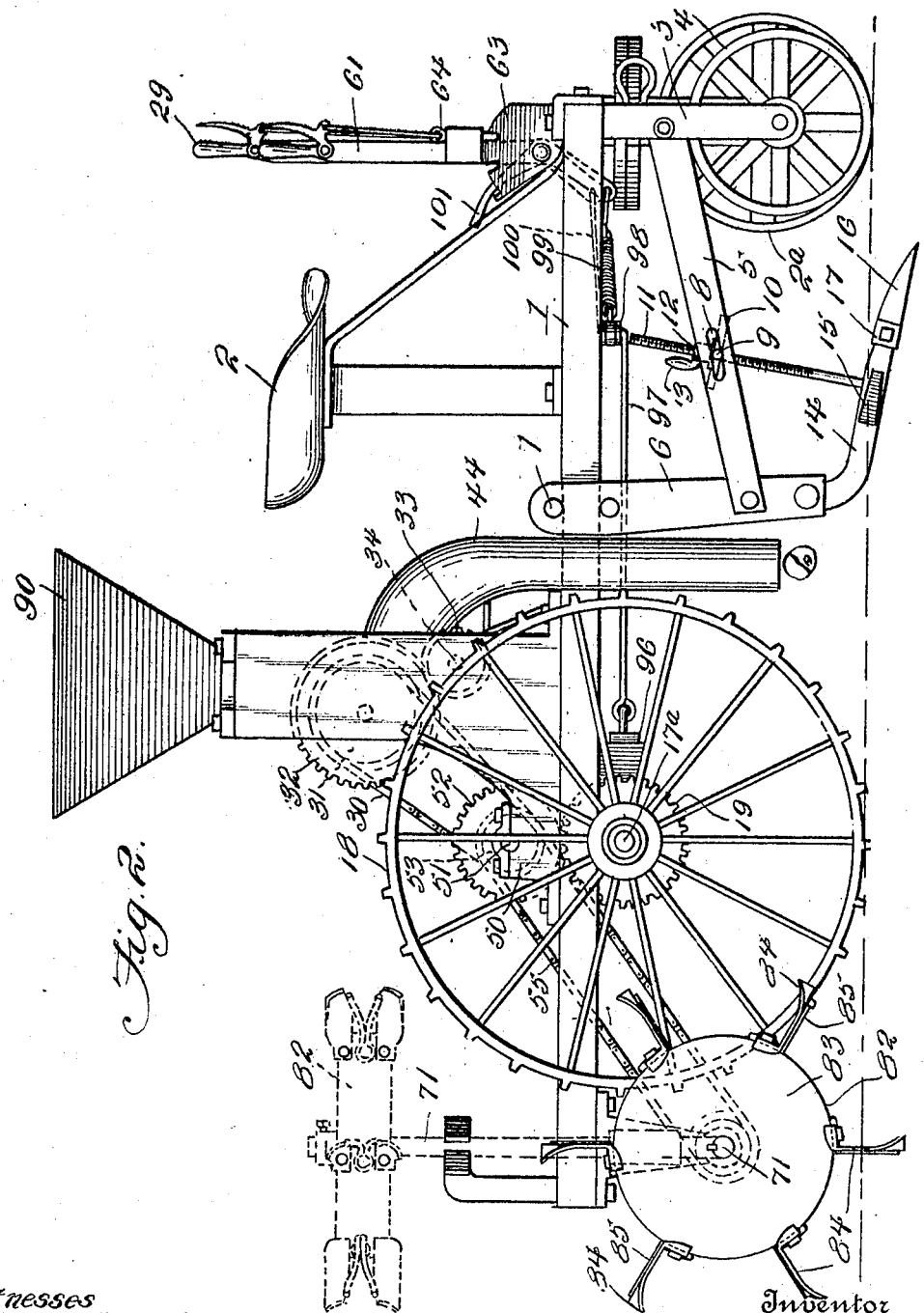

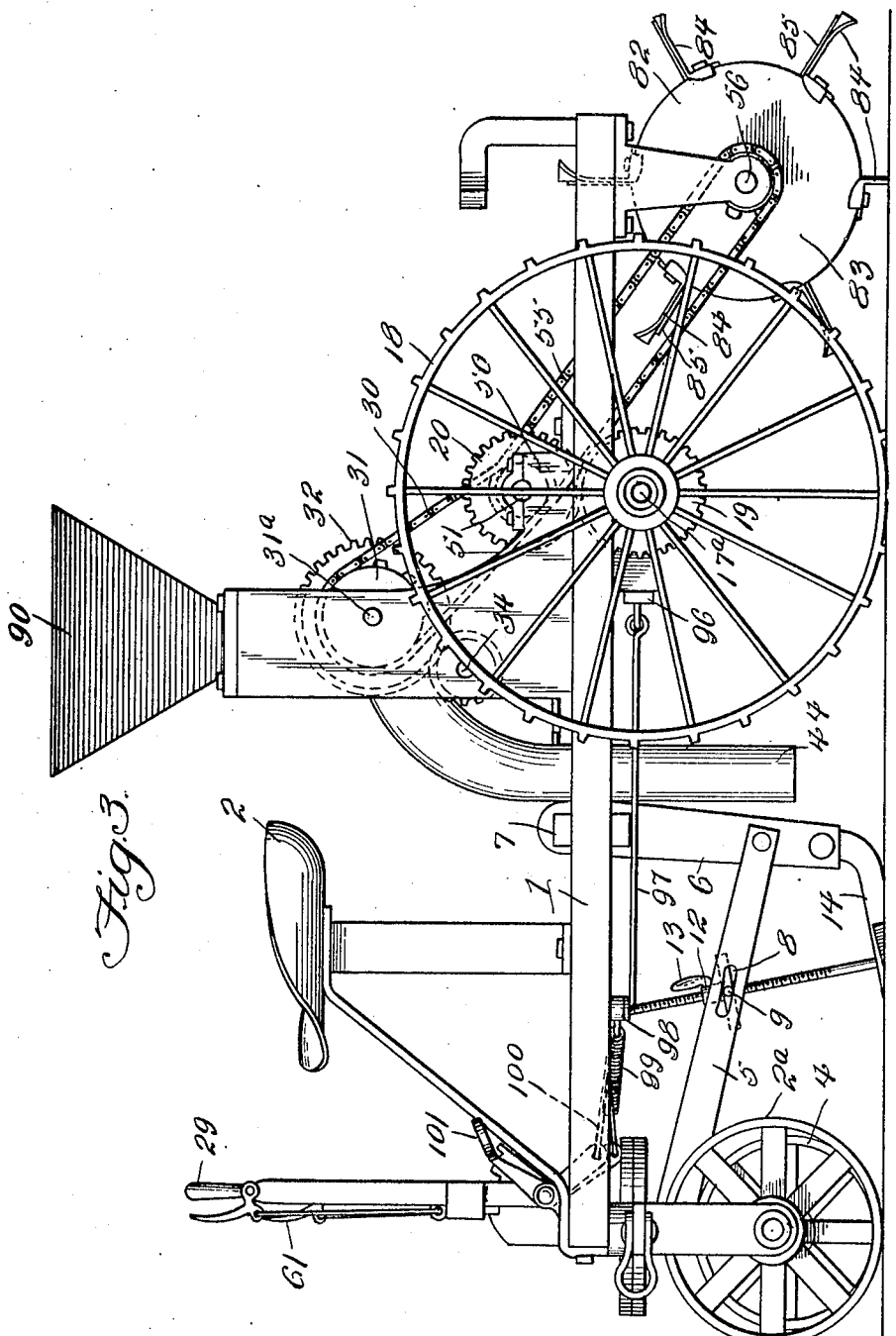

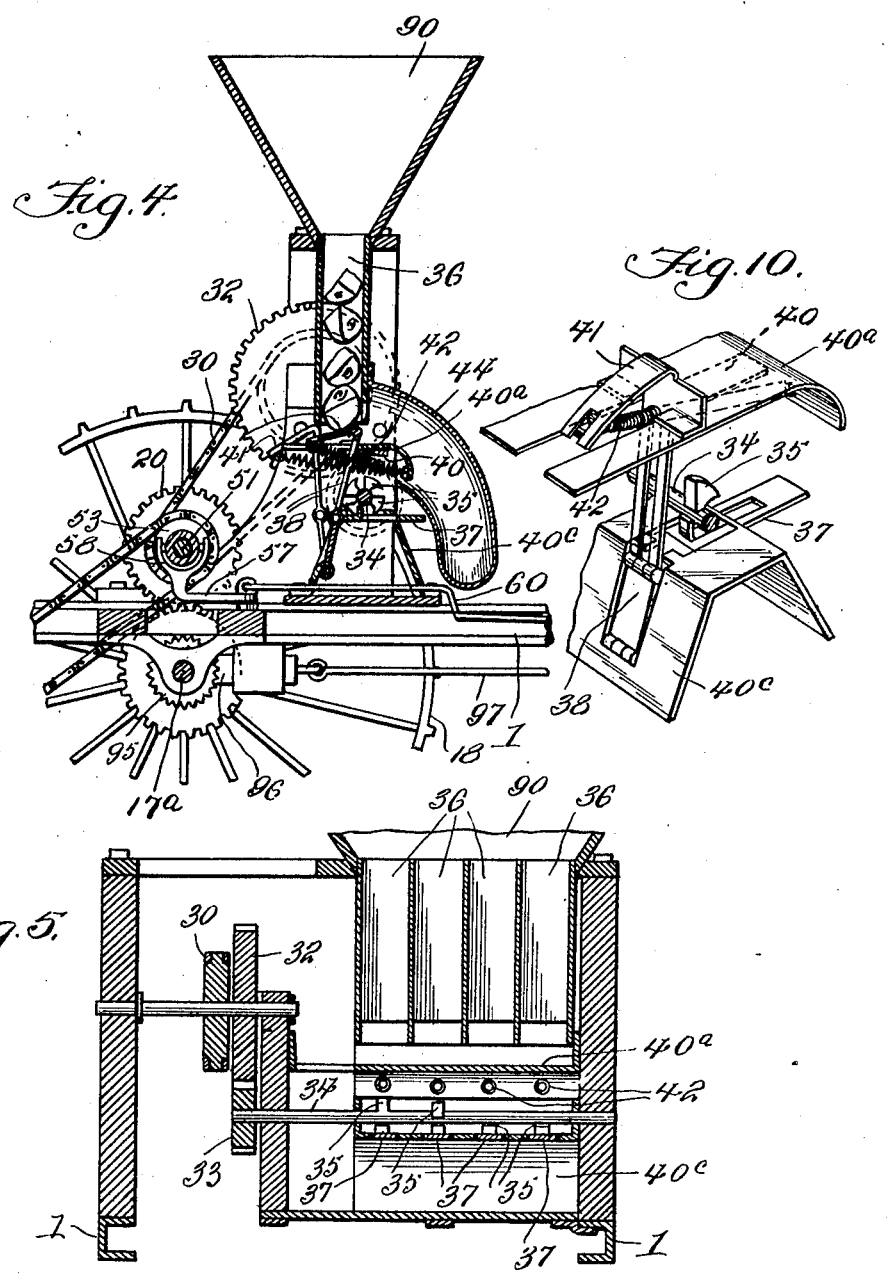

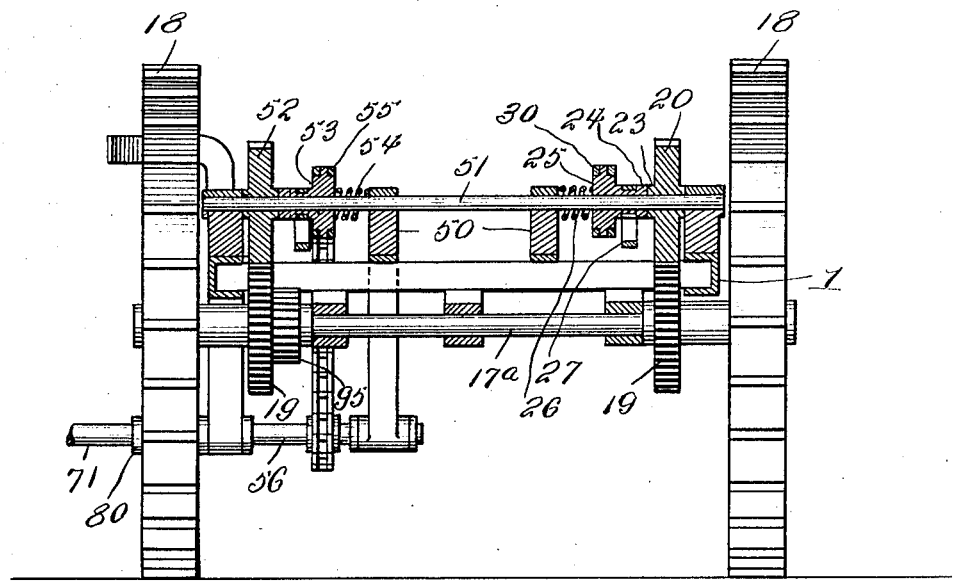
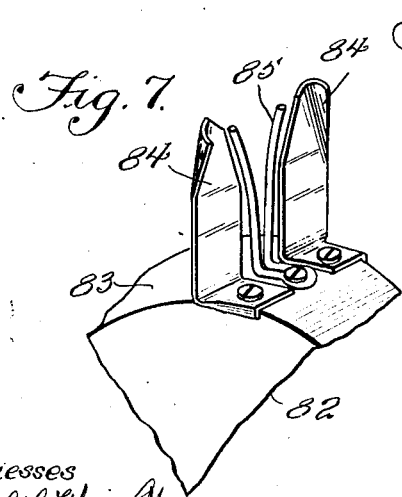
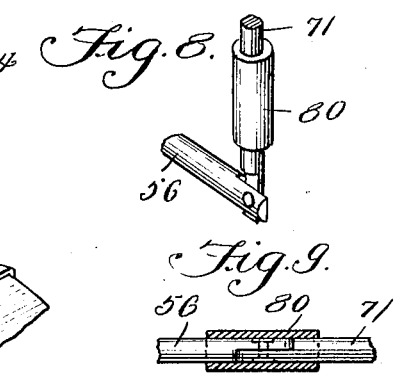

UNITED STATES PATENT OFFICE.

FRANK POLSINELLI, OF BENWOOD, WEST VIRGINIA.

SOWING-MACHINE CONSTRUCTION.

1,308,679. Specification of Letters Patent. Patented July 1, 1919.

Application filed August 27, 1918. Serial No. 251,652.

*To all whom it may concern:*

Be it known that I, FRANK POLSINELLI, a citizen of the United States, residing at Benwood, in the county of Marshall and State of W. Virginia, have invented new and useful Improvements in Sowing-Machine Constructions, of which the following is a specification.

My present invention pertains to planters and it contemplates the provision of a simple and efficient planter designed more especially for depositing pieces of potato in furrows formed to receive the same.

The invention also contemplates the provision in a potato planter of improved means for effectually covering the deposited pieces of potato, and this without liability of the potato pieces being displaced or injured.

Other objects and advantages of the invention will be fully understood from the following description and claims when the same are read in connection with the drawings accompanying and forming part of this specification, in which:

Figure 1 is a plan view of a potato planter constructed in accordance with my invention.

Fig. 2 is an elevation of one side of the machine.

Fig. 3 is an elevation of the opposite or left hand side thereof.

Fig. 4 is a longitudinal vertical section taken in the plane indicated by the line 4—4 of Fig. 1 and showing in detail the feed mechanism.

Fig. 5 is a transverse vertical section taken in the plane indicated by the line 5—5 of Fig. 1 and showing the feed mechanism and the driving connection thereof.

Fig. 6 is a transverse vertical section taken in the plane indicated by the line 6—6 of Fig. 1, and showing the driving connections adjacent to the rear ground wheels.

Fig. 7 is an enlarged detail perspective illustrative of one pair of radial blades on the covering wheel, and the fork intermediate said blades.

Fig. 8 is a fragmentary perspective showing the sleeve 80 off the joint.

Fig. 9 is a detail view, partly in elevation and partly in section showing the said sleeve on the joint.

Fig. 10 is a fragmentary perspective illustrative of one of the followers and the parts that coöperate therewith.

Similar numerals of reference designate corresponding parts in all the views of the drawings.

The main frame 1 of the planter bears a driver's seat 2 and may be of the construction illustrated, or of any other construction compatible with the purpose of my invention. The forward portion of said frame is mounted upon a caster wheel $2^a$, and to the right of said caster wheel is a hanger 3, fixed to the frame and carrying a wheel 4. Fixed to the said hanger 3 and extending downwardly and rearwardly therefrom are longitudinal bars 5 which are connected at their rear ends to hangers 6, mounted on a bar 7, fixed to and extending laterally from the frame 1. Formed in the bars 5 are slots 8, and disposed loosely in said slots are trunnions 9 at the ends of a platform 10. Extending loosely through the said platform 10 is a threaded rod 11 and superimposed on the platform and engaging the said rod is a nut 12, equipped with a handle 13 so that the nut may be expeditiously and easily turned for the elevation or depression of the rod. At its lower end the said threaded rod is connected to the shank 14 of a furrow opener, which shank is provided with lateral wings 15 and is pivoted at its rear end between the last mentioned hangers so as to be capable of swinging in a vertical plane. At its forward end the said furrow opener is provided with a point 16 and in the preferred embodiment of the invention the said point has a sleeve as 17 forming its rear portion so that it may be readily slipped off the furrow opener when it is desired to give place to a new point.

Disposed under the rear portion of the frame 1 and fixed thereto is an axle $17^a$, and on said axle are ground wheels 18. Each of these ground wheels has fixed to its inner side a spur gear 19, and intermeshed with the spur gear 19 of the left hand ground wheel is a spur gear 20 loosely mounted upon the frame. The spur gear 19 is provided at its inner side with a clutch member 23 and opposed to said clutch member 23 is a clutch member 24 on a sprocket gear 25 loose upon the shaft. The said sprocket gear 25 is backed by a spring 26 which is interposed between it and the adjacent standard and serves to normally hold the clutch members in engagement. With a view to moving the clutch member of the sprocket gear out of engagement with that of the spur gear, a horizontal lever 27 is provided; the said lever 27 being of bell crank formation and having a fork on its rear arm engaging with the sprocket gear 25 and also having its forward arm connected through a rod 28 with a hand lever 29. This hand lever 29 is mounted on the frame adjacent to a segmental rack 30 and is equipped with a detent 31 through the medium of which the lever may be adjustably fixed with respect to the rack to retain the clutch members referred to in engagement.

The sprocket gear 25 is connected through a sprocket belt 30 with a sprocket gear 31 on a shaft 31ᵃ. Also mounted on the shaft 31ᵃ is a spur gear 32 which is inter-meshed with a spur gear 33 on the cam shaft 34 of the seed supply mechanism. The said shaft 34 is provided with cams 35 corresponding in number to receptacles 36 employed there being four of said receptacles in the illustrated embodiment of my invention. As best shown in Fig. 4 each cam 35 is adapted to bring up against and move a forwardly extending arm 37 on a vertically disposed seed-displacing lever 38. The said levers 38 are respectively pivoted at their lower ends and located below their respective receptacles and each lever is provided at its upper end with a follower 40 movable over the bottom of its receptacle and is also provided with a rearwardly extending arm 41. This arm 41 serves for the connection of the rear end of a retractile spring 42, the forward end of which is connected to the lower frame portion of the said mechanism. The several cams on the cam shaft are differently disposed and consequently it will be manifest that as the planter is drawn or otherwise moved forwardly the said displacing levers of the receptacles will be actuated one after the other to insure a practically continuous supply of potato pieces to the discharge chute 44 which is arranged transversely in front of the several potato receptacles and has its outer end extended laterally beyond the frame and arranged in the same longitudinally vertical plane as the before described furrow opener. In this connection it will be noticed that the displacing levers are movable in slots in a platform 40ᵃ arranged under and spaced from the receptacles; also, that the cams engage abutments on bars 37 that extend forwardly from the displacing levers and are suitably guided in a base frame 40ᶜ arranged under the platform.

Disposed in rear of the said supply mechanism and journaled in standards 50 on the frame 1, is a transverse shaft 51 on which are loosely mounted a spur gear 52 and a sprocket gear 53. The sprocket gear 53 is backed by spring 54 and is connected through a sprocket belt 55 with a lower and rear transverse shaft 56.

Fulcrumed on the main frame 1 is a bell crank lever 57, and on the rear arm of said lever is a fork 58 which engages the sprocket gear 53 and is designed to move the said sprocket gear against the action of a spring 59 so as to separate the clutch member on said gear 53 from the complementary member on the spur gear 52. Connected to the forward arm of the bell crank 57 is a rod 60 which is connected at its forward end to a hand lever 61 arranged adjacent to a segmental rack 63 and having a detent 64 to engage the said rack. By virtue of this provision the driver is manifestly enabled to establish or interrupt the driving connection to the lower and rear transverse shaft 56.

Hinged at 70 to the shaft 56 is a shaft section 71, and in order to hold the said shaft section 71 in alinement with the shaft 56 a sleeve 80 may be employed, the said sleeve 80 being adapted to slip on and off the joint as occasion demands. When the sleeve is off the joint, the shaft section 71 and the covering wheel 82 fixed thereon may be swung upwardly to an idle position. The covering wheel 82 comprises a body 83, pairs of blades 84 extending radially from the periphery thereof, and forks 85 interposed between the blades. The blades and the forks are possessed of resiliency and hence they will serve to thoroughly cover the deposited pieces of potato without injuring the same and without materially increasing the draft of the planter. The blades and the forks are fixed at their inner ends to the periphery of the wheel body, and the outer ends of the blades are preferably flared as illustrated in order to increase their covering capacity.

In the practical operation of my planter the pieces of potato are placed in a hopper 90 arranged in registration with the several vertically disposed receptacles before described. Consequently when the machine is drawn or otherwise moved forwardly and the cam shaft 34 is rotated the pieces of potato will be displaced from the receptacle and deposited in the lateral spout by which they will be dropped into the furrow formed to receive them. When the covering wheel is employed it serves as before indicated to effectually arrange the earth over the potato pieces without liability of displacing or injuring the same. It will be understood in the foregoing connection that the covering wheel, when used, is constantly driven from the adjacent ground wheel.

Fixed with respect to the right end ground wheel is a serrated disk 95 and opposed to and adapted to engage the said disk is a rectilineally movable dog 96, the said dog is connected with the forward end of the rod 97, and the rear end of said dog is connected to one arm of the bell crank 98 fulcrumed under the main frame and movable in one direction by a retractile spring 99. Also connected to the said bell crank is a rod 100 which extends forwardly and is connected to a pedal lever 101. This provision enables the operator to conveniently brake the planter when for any reason it is desired to retard the forward movement of the same.

Having described my invention what I claim and desire to secure by Letters-Patent is:

1. In a planter, the combination of a main frame, a transverse series of vertically disposed receptacles, a slotted platform disposed below and spaced from the lower ends of the receptacles, a spout arranged to receive potato pieces from the platform, followers movable forwardly and rearwardly on the platform, levers movable in the slots of the platform and connected to the followers, yielding means for moving the levers in one direction, a shaft having differently disposed cams for moving the levers in the other direction and means for rotating the cam shaft.

2. In a planter, the combination of a main frame, a transverse series of vertically disposed receptacles, a slotted platform disposed below and spaced from the lower ends of the receptacles, a spout arranged to receive potato pieces from the platform, followers movable forwardly and rearwardly on the platform and having rearwardly extending and downwardly curved arms, levers movable in the slots of the platform and connected to the followers, yielding means connected to said arms for moving the levers in one direction, a shaft having differently disposed cams for moving the levers in the other direction, and means for rotating the cam shaft.

In testimony whereof I affix my signature.

FRANK POLSINELLI.

Copies of this patent may be obtained for five cents each, by addressing the "Commissioner of Patents, Washington, D. C."